US012745089B2

(12) United States Patent
Reeves et al.

(10) Patent No.: US 12,745,089 B2
(45) Date of Patent: Sep. 22, 2026

(54) AVOIDING COMMUNICATIONS OVER RISKY NON-TERRESTRIAL NETWORKS

(71) Applicant: T-Mobile USA, Inc., Bellevue, WA (US)

(72) Inventors: Raymond E. Reeves, Orlando, FL (US); Simon Youngs, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 267 days.

(21) Appl. No.: 18/744,386

(22) Filed: Jun. 14, 2024

(65) Prior Publication Data

US 2025/0386195 A1 Dec. 18, 2025

(51) Int. Cl.

*H04W 12/122* (2021.01)
*H04W 12/06* (2021.01)
*H04W 84/06* (2009.01)

(52) U.S. Cl.

CPC ......... *H04W 12/122* (2021.01); *H04W 12/06* (2013.01); *H04W 84/06* (2013.01)

(58) Field of Classification Search

CPC ............................ H04W 12/122; H04W 12/06
See application file for complete search history.

(56) References Cited

U.S. PATENT DOCUMENTS 7,860,037 B2 12/2010 Chen
8,363,664 B2 1/2013 Ramankutty et al.
8,441,985 B2 5/2013 Kim et al.
9,560,212 B2 1/2017 Stenfelt et al.
9,622,281 B2 4/2017 Axmon et al.
9,661,544 B2 5/2017 Jamadagni et al.
9,876,670 B2 1/2018 Richardson
11,212,864 B2 12/2021 Wang
11,405,803 B2 8/2022 Fiorese et al.
11,463,892 B2 10/2022 Bergström et al.
2004/0008650 A1 1/2004 Le et al.
2005/0213541 A1 9/2005 Jung et al.
2007/0280187 A1 12/2007 Wang et al.
2010/0056146 A1 3/2010 Guo et al.
2012/0202487 A1 8/2012 Kazmi et al.
2012/0213105 A1 8/2012 Wigren et al.
(Continued)

FOREIGN PATENT DOCUMENTS

CN 102668622 B 4/2015
CN 104662959 A 5/2015
(Continued)

*Primary Examiner* — Curtis B Odom
(74) *Attorney, Agent, or Firm* — Ashurst Perkins Coie US LLP

(57) ABSTRACT

A wireless device receives a signal from a purported non-terrestrial network (NTN) and initiates verification of the legitimacy of the purported NTN. The wireless device detects an actual angle of arrival of the signal from the purported NTN and determines an expected angle of arrival of the signal from a legitimate NTN known to the wireless device, based on the device's current location orientation, or speed. The purported NTN is legitimate if the actual angle of arrival of the signal is within a threshold deviation of the expected angle of arrival of the signal, and the purported NTN is fraudulent if the actual angle of arrival of the signal is not within the threshold deviation of the expected angle of arrival of the signal.

20 Claims, 6 Drawing Sheets

(56) References Cited

U.S. PATENT DOCUMENTS

| | | | | |
|---|---|---|---|---|
| 2013/0190006 | A1 | 7/2013 | Kazmi et al. | |
| 2015/0200849 | A1 | 7/2015 | Wen et al. | |
| 2018/0255505 | A1 | 9/2018 | Thyagarajan et al. | |
| 2021/0168633 | A1 | 6/2021 | Enat et al. | |
| 2022/0086713 | A1 | 3/2022 | Määttänen et al. | |
| 2023/0127924 | A1 | 4/2023 | Srinivasan et al. | |
| 2023/0328522 | A1 | 10/2023 | Shah | |
| 2024/0049206 | A1 | 2/2024 | Hévizi et al. | |
| 2025/0158972 | A1* | 5/2025 | Madni | H04W 12/069 |

FOREIGN PATENT DOCUMENTS

| | | | |
|---|---|---|---|
| EP | 2761902 | A1 | 8/2014 |
| EP | 3029997 | B1 | 8/2019 |
| EP | 3301964 | B1 | 4/2020 |
| EP | 3642095 | A1 | 4/2020 |
| EP | 3729869 | B1 | 8/2022 |
| JP | 7003984 | B2 | 1/2022 |
| JP | 7056875 | B2 | 4/2022 |
| KR | 101044862 | B1 | 6/2011 |
| KR | 102528728 | B1 | 5/2023 |
| WO | 2006010335 | A1 | 2/2006 |
| WO | 2006136103 | A1 | 12/2006 |
| WO | 2012019317 | A1 | 2/2012 |
| WO | 2012146202 | A1 | 11/2012 |
| WO | 2024025649 | A1 | 2/2024 |

* cited by examiner

AVOIDING COMMUNICATIONS OVER RISKY NON-TERRESTRIAL NETWORKS

BACKGROUND

Network spoofing is the creation of a fake network connection that masquerades as an authentic one. By deceiving individuals into joining this fake network, a rogue operator may obtain sensitive information such as login credentials, financial data, and other important details. The rogue operator might further compromise the target's safety and privacy by installing malware on their device through the fake connection.

For example, in an "Evil Twin attack," the rogue operator can create a non-terrestrial network (NTN) that has the same identity and various configurations as a real NTN. Once the device used by the victim joins the fake NTN, the rogue operator may spy on a subscriber's online activity and obtain confidential information.

BRIEF DESCRIPTION OF THE DRAWINGS

Detailed descriptions of implementations of the present invention will be described and explained through the use of the accompanying drawings.

Figure 1:
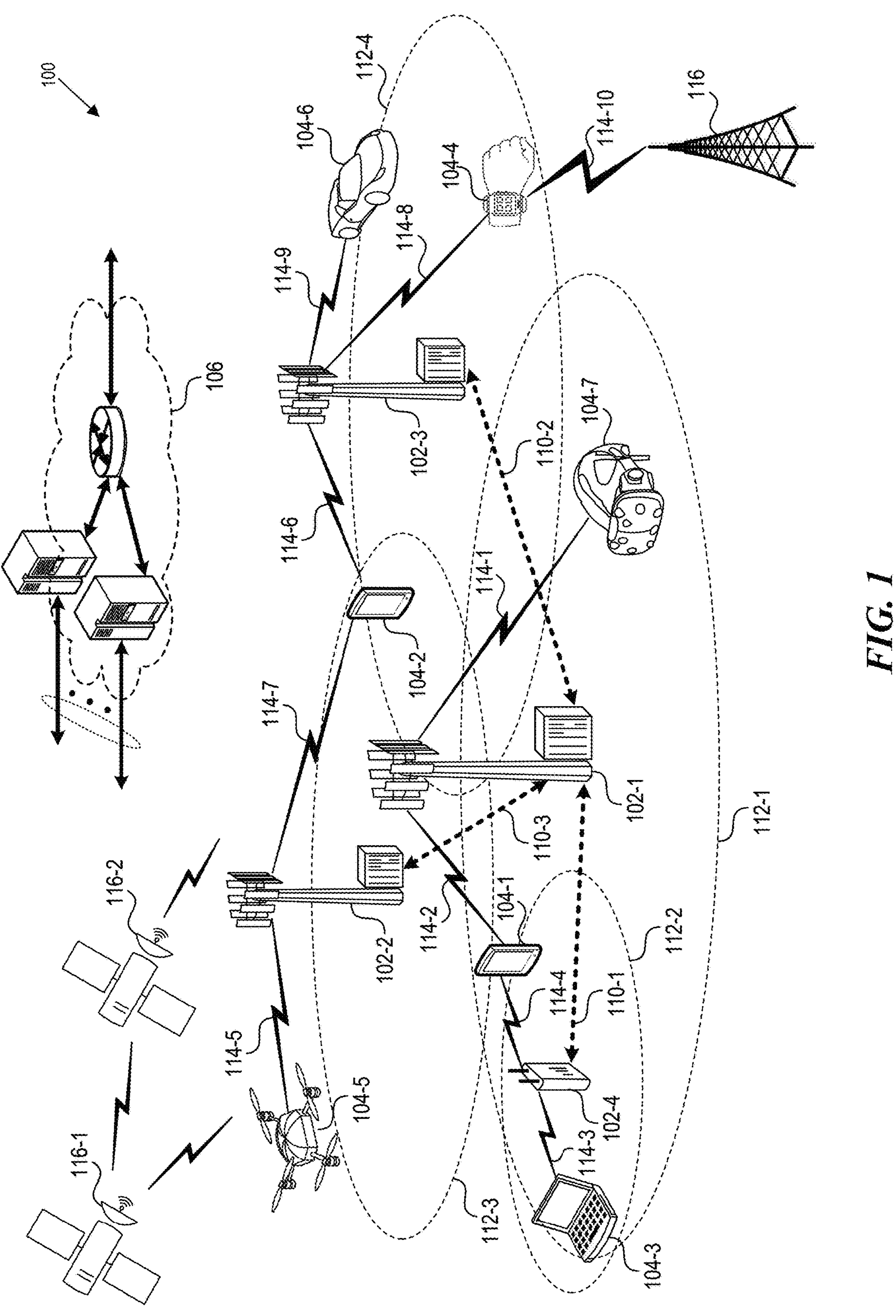
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a system of a wireless device for determining whether a purported non-terrestrial network (NTN) is a legitimate NTN to which the wireless device is allowed to connect, or whether it is a fraudulent NTN to which the wireless device's connection should be disallowed. The system can be referred to herein as "ACORN" (Avoiding Communications over Risky Non-terrestrial networks). The wireless device can be referred to herein as "UE" (User Equipment). The UE includes sensors for determining a physical orientation of the UE with respect to a reference plane, a current location of the UE based on GPS coordinates, a current speed and acceleration of the UE, and an angle of arrival (AoA) of a signal at the UE. The sensors can include a gyroscope and an accelerometer. The UE is configured to receive a signal from an NTN. The UE includes an agent function that is responsible for determining whether a purported NTN is legitimate or fraudulent. The agent function is a software component that is an agent of a system of the wireless device. In some implementations, the agent function makes the determination by calculating an angle of arrival of the signal received from the purported NTN and comparing it against an expected angle of arrival of a signal at a current location of the UE from a legitimate NTN. In some implementations, the agent function makes the determination by comparing the signal received from the purported NTN with an expected radio frequency (RF) fingerprint of a signal at a current location of the UE from a legitimate NTN. In some implementations, the agent function makes the determination by calculating a Doppler pattern of a signal received from the purported NTN and comparing it against an expected Doppler pattern at a current location of the UE from a legitimate NTN.

The agent function calculates the expected angle of arrival, RF fingerprint, or Doppler pattern of the legitimate NTN from flight path characteristics of network nodes of the NTN that it receives from a manager function disposed in a home telecommunications network of the wireless device. The home telecommunications network of the wireless device is a telecommunications network that a user of the wireless device is subscribed to and receives service from in a normal operating mode of the wireless device. The manager function is a software component that manages a system of the telecommunications network. The flight path characteristics can include location, direction of travel, angle of arrival, azimuth, elevation, or speed of network nodes of the legitimate NTN. In some implementations, the agent function can further determine whether a purported NTN is legitimate or fraudulent based on a current operational status of the network nodes of the legitimate NTN. The current operational status of the network nodes comprises an indicator for whether the node is on air, off air, or access-restricted, and whether the node is undergoing a planned or unplanned outage. In some implementations, the agent function can receive the flight path characteristics and current operational status of network nodes in the legitimate NTN from the manager function during the UE's standard booting-up and network registration process. In some implementations, the manager function can periodically receive the flight path characteristics of network nodes in the legitimate NTN from the manager function. In some implementations, the agent function can send a request to the manager function to receive updated flight path characteristics of network nodes in the legitimate NTN.

The inventors have recognized that as mobile network operators launch services to provide backup satellite roaming connectivity in remote areas to ordinary cellphone devices outside their networks' cellular coverage footprint, it is critical that subscribers be protected from rogue operators broadcasting spurious signals that impersonate legitimate NTN services. Since launching and operating an NTN is complex and expensive, it is possible that a subscriber who encounters a purported NTN signal would trust that the signal is coming from a legitimate NTN. It is also likely that a subscriber in need of connectivity in a remote area would feel compelled to connect to a purported NTN signal, potentially exposing their data to a rogue operator. It is also possible that a rogue operator could broadcast a spurious NTN signal to trick subscribers of the telecommunications network into connecting to the purported NTN and then unlawfully levy excessive roaming charges on the telecommunications operator. The disclosed technology aims to limit the risk from the aforementioned accounting and security breach scenarios by adding a security layer in the UE that allows the UE to connect only to legitimate NTNs. In some implementations, the NTN can include airborne network nodes, such as those disposed on airplanes, drones, balloons, or airships. In some implementations, the NTN can include space-based network nodes, such as those disposed on satellites. A legitimate NTN is an NTN that is known to the agent function and to which the UE is allowed to connect by an operator of the telecommunications network.

The agent function is configured as an additional security layer on the UE. The UE is configured to verify with the agent function whether an NTN signal received by the UE at its current location is a legitimate NTN before connecting to the NTN. In some embodiments, the UE is further configured to include information elements (IEs) related to the verification of the NTN in the measurement reports it sends to an Operations Support System (OSS) of the telecommunications network. The information elements can include a received signal strength indicator of the NTN, a received signal quality indicator of the NTN, or an identifier communicated by the NTN. In some implementations, the OSS determines whether the NTN is a legitimate NTN based on information elements received from the UE in the measurement reports. In some implementations, a Business Support System (BSS) of the telecommunications network is configured to determine whether the purported NTN from which a signal is received at the UE is a legitimate NTN.

The communication between the agent function on the UE and the OSS is encrypted end-to-end (E2E) with at least a first security key. The communication between the manager function and the OSS is also encrypted with at least a second security key. In some implementations, the first security key can be the same as the second security key. In some implementations, the telecommunications network can include a plurality of manager functions. The manager functions can receive periodic updates from the OSS pertaining to security keys associated with each UE that is capable of receiving service from an NTN. The manager functions are configured to communicate NTN-related information elements and service details to the BSS.

The UE, upon receiving a purported NTN signal, initiates a process to verify the legitimacy of the NTN by the agent function onboard the UE. The agent function uses readings from a gyroscopic sensor, an acceleration sensor, and an orientation sensor of the UE, a current location of the UE, a current speed of the UE, and flight characteristics of a constellation of airborne or space-based network nodes of the legitimate NTN that the agent function has received from the manager function, to determine whether the angle of arrival, the Doppler fading pattern, or the RF fingerprint of the signal from the purported NTN matches an expected value of the corresponding measurement of the legitimate NTN. In some implementations, a match is determined if an expected and an actual measurement are within a threshold deviation of each other. If the probability that the purported NTN is a legitimate NTN is equal to or greater than a threshold probability, the agent function allows the UE to connect to the NTN. If the probability that the purported NTN is a legitimate NTN is lower than the threshold probability, the agent function prohibits the UE from connecting to the NTN. When, in response to the agent function determining that the NTN is legitimate, the UE connects to the NTN, the UE initiates encrypted communication with the manager function, the OSS, or the BSS to send measurement reports including information elements pertaining to signal measurements of the NTN to assist the manager function, OSS, or BSS, for example, in future identification of the legitimate NTN.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a non-terrestrial network (NTN) is enabled by one or more satellites, such as satellites 116-1 and 116-2, to deliver services anywhere and anytime and provide coverage in areas that are unreachable by any conventional terrestrial network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
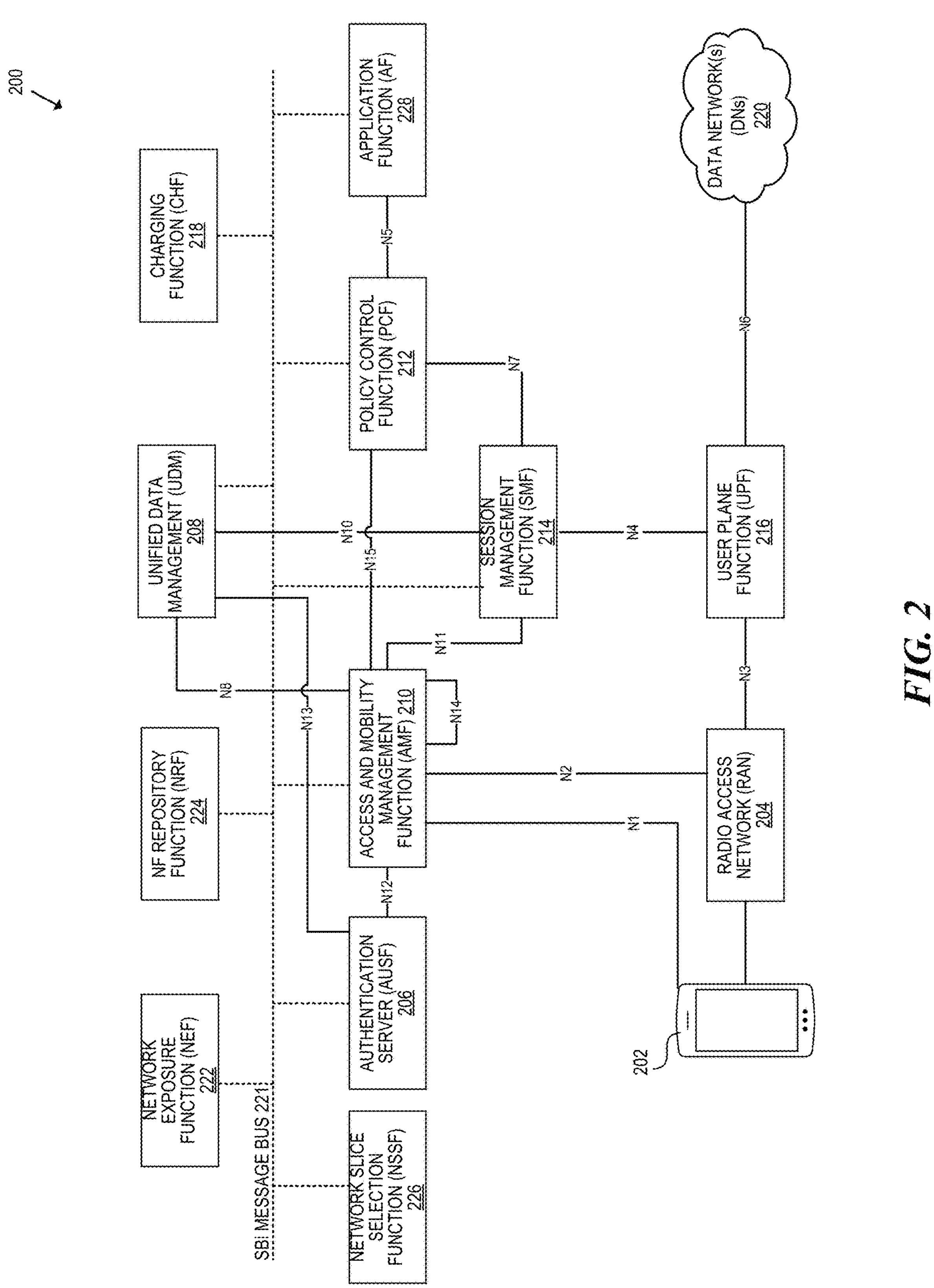
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Avoiding Communications Over Risky Non-Terrestrial Networks

Figure 3:
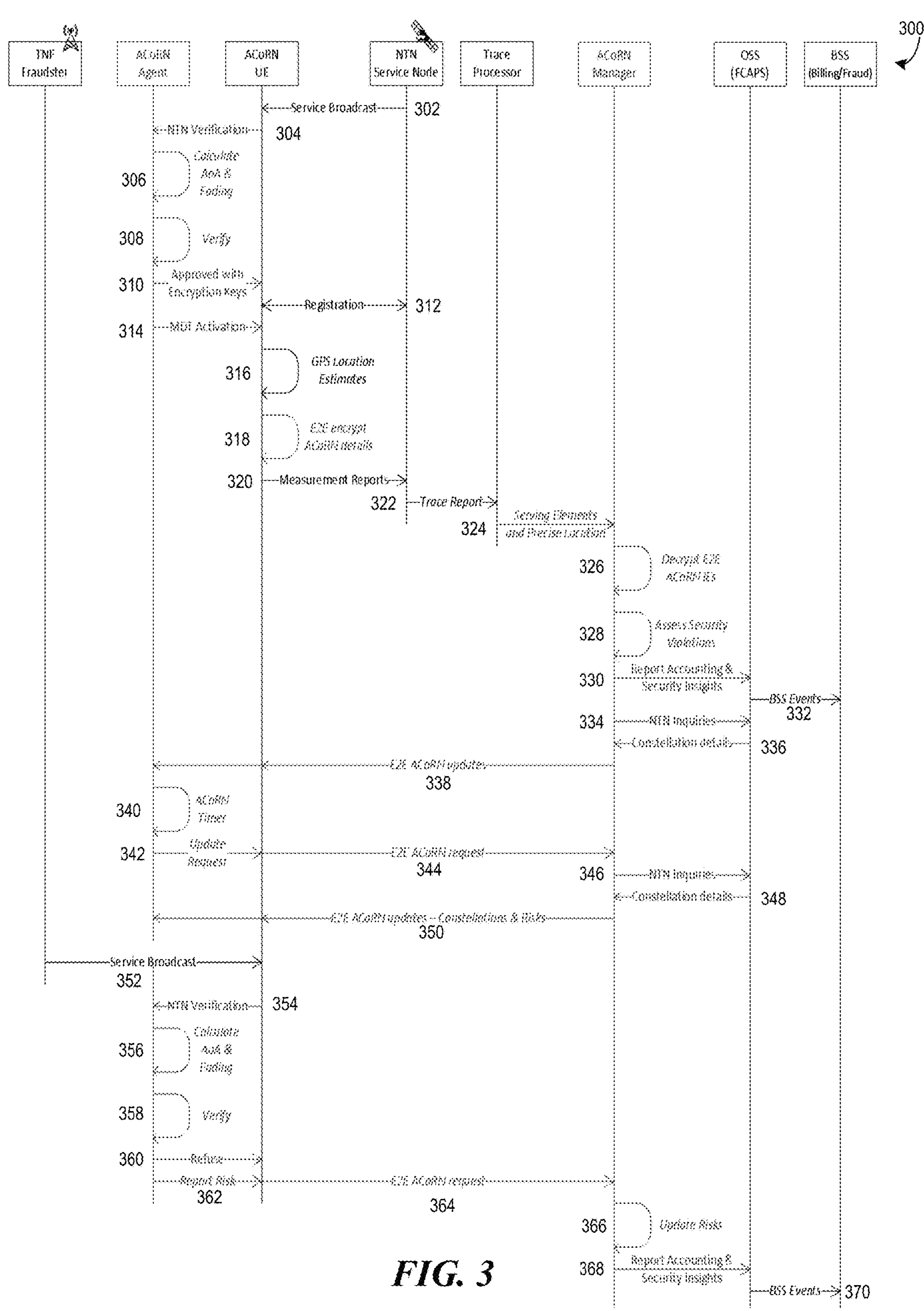
FIG. 3 is a call flow diagram of a method for implementing at least some aspects of the disclosed technology.

FIG. 3 is a call flow diagram of a method 300 for implementing at least some aspects of the disclosed technology. When at least some aspects of the disclosed technology are implemented in a UE, the UE can be referred to herein as an ACORN UE. The agent function can be referred to herein as the ACORN agent function. The ACORN UE is configured to include the ACORN agent function. The manager function can be referred to herein as the ACORN manager function. The ACORN UE is configured to receive service from an NTN network node. The NTN service node is a network node of the NTN. The telecommunications network includes a trace processor function that comprises one or more network probes disposed at one or more locations within the coverage area of the telecommunications network, along with the necessary infrastructure to receive, store, and analyze network measurement, performance, and health reports received from one or more network probes and network nodes in the telecommunications network. The telecommunications network also includes at least one Operations Support System (OSS) for managing network nodes in the telecommunications network. The OSS supports various network management functions such as fault management, configuration management, accounting management, performance management, and security management, collectively known as FCAPS functions.

At 302, the UE receives a signal purportedly transmitted by a network node of an NTN. The signal is considered to be purportedly transmitted by an NTN because the identity of the NTN is yet to be validated by the agent function in the UE. If the agent function successfully validates the NTN, the NTN is considered to be a legitimate NTN to which the UE is allowed to connect. If the agent function cannot successfully validate the NTN, a transmitter of the received signal is considered to be a fraudulent or illegitimate NTN to which the UE is prohibited from connecting.

At 304, the UE sends a request to the agent function to verify the legitimacy of the NTN. At 306, the agent function calculates the angle of arrival of the signal, the RF fingerprint, and/or the Doppler fading pattern of the received signal based on readings from sensors onboard the UE. At 308, the agent function verifies whether the results of the aforementioned calculations match their corresponding expected values for a legitimate NTN that is known to the agent function. A match can be determined if an expected and an actual measurement are within a threshold deviation of each other. If the results of the calculations match the expected values, the agent function determines the NTN to be legitimate. If the results of the calculations do not match the expected values, the agent function determines the NTN to be fraudulent or illegitimate. At 310, if the agent function determines the NTN to be legitimate, it approves the UE to connect to the NTN. The agent function provides encryption keys to the UE for communicating with the NTN.

At 312, upon receiving approval from the agent function, the UE initiates a network registration process with the NTN following the UE's standard network registration procedures for communicating with NTNs. At 314, the agent function initiates a minimization of drive testing (MDT) function in the UE. The MDT function is configured to measure and report network measurements of the NTN. The network measurements comprise information elements related to received signal strength, received signal quality, network latency, network jitter, traffic volume (tonnage), network reliability, network availability, peak data throughput, user data throughput, spectral efficiency, connection density, energy efficiency, mobility, configured spectral bandwidth, identifiers of network nodes from which the UE is receiving a signal at a current location of the UE, and device model and software version of the UE. In some implementations, the aforementioned information elements can pertain to the NTN. In some implementations, the aforementioned information elements can pertain to any terrestrial or non-terrestrial network to which the UE is connected.

At 316, the UE estimates its location based on its GPS coordinates. At 318, the UE encrypts the information elements using encryption keys received from the agent function in step 310. At 320, the UE sends at least one periodic or aperiodic measurement report including the information elements to the network node. At 322, the network node sends a trace report containing the information elements to the trace processor. In some implementations, the measurement report communicated by the network node to the trace processor function can further include information regarding at least one network measurement related to the UE, at least one network event related to the UE, at least one network configuration, or at least one network event related to the network node itself.

At 324, the trace processor sends the information elements to the manager function. The information elements include a current or a last known location of the UE and identifiers of the network nodes of the NTN from which the UE is receiving a signal at its current location. In some implementations, the trace processor receives the measurement report from the network node and communicates the measurement report wholly or in part to the manager function. In some implementations, the trace processor extracts information from the measurement report or determines a metric based on the measurement report, and communicates the extracted information or the metric to the manager function.

At 326, the manager function decrypts the E2E encrypted communication received from the trace processor and extracts the information elements (IEs) from it. At 328, the manager function assesses whether the UE has experienced any security violations. The security violation can include, for example, the UE receiving a signal from or connecting to a fraudulent NTN.

At 330, the manager function reports its assessment to the OSS. The manager function further reports details about the UE's connection to the legitimate or fraudulent NTN for accounting purposes such as, for example, charging a subscriber of the UE for roaming on the NTN. At 332, the OSS reports the accounting information received from the manager function to a Business Support System (BSS) of the telecommunications network.

At 334, the manager function sends an NTN inquiry to the OSS. At 336, the OSS responds to the inquiry with details about a constellation of network nodes of the legitimate NTN including, for example, flight path characteristics of the network nodes, a current operational status of the network nodes, or details about planned or unplanned outages currently being experienced by the network nodes.

At 338, the manager function sends an update including flight path characteristics or current operational status of the network nodes of the legitimate NTN to the agent function via the UE. The current operational status of the network nodes comprises an indicator for whether the node is on air, off air, or access-restricted, and whether the node is undergoing a planned or unplanned service outage. A network node is considered on air when it is in a normal mode of operation and providing service to subscribers. A network node is considered off air when it is not transmitting a signal and not providing service to subscribers. A network node is considered access-restricted when it is providing service only to a subset of UEs, for example, test UEs that are configured to conduct network testing, and broadly denying service to all other UEs.

At 340, the agent function initiates a timer to track the temporal validity of the update. At 342, upon expiry of the timer, the agent function sends, via the UE, an update request to the manager function to obtain updated information regarding the constellation of NTN network nodes. The update request can be referred to herein as an E2E ACORN request 344. At 346, in response to receiving the update request from the agent function, the manager function sends an NTN inquiry to the OSS.

At 348, the OSS responds to the inquiry with updated details about a constellation of network nodes of the legitimate NTN including, for example, flight path characteristics of the network nodes, a current operational status of the network nodes, or details about planned or unplanned outages currently being experienced by the network nodes. At 350, the manager function sends an update including flight path characteristics, current operational status, or current outage status of the network nodes of the legitimate NTN to the agent function via the UE.

The following steps illustrate a scenario in which the UE receives a signal from a fraudulent NTN. At 352, the UE receives a signal at its current location identifying the transmitter as belonging to a legitimate NTN. The fraudulent NTN can be referred to herein as a terrestrial network fraudster (TNF). At 354, the UE sends a request to the agent function to verify the legitimacy of the NTN. At 356, the agent function calculates the angle of arrival of the signal, the RF fingerprint, or the Doppler fading pattern of the received signal based on readings from sensors onboard the UE.

At 358, the agent function verifies whether the aforementioned calculations match their corresponding expected values for a legitimate NTN that is known to the agent function. Here, the calculations do not match the expected values, and the agent function determines the NTN to be fraudulent or illegitimate. At 360, the agent function rejects the UE's request to connect to the fraudulent NTN. At 362, the agent function initiates a process for the UE to report the identified fraudulent NTN to the manager function. At 364, the UE sends a request including details of the identified fraudulent NTN to the manager function. At 366, the manager function stores details of the identified fraudulent NTN in an internal database or data model of the manager function. At 368, the manager function reports details of the identified fraudulent NTN to the OSS. At 370, the OSS reports details of the fraudulent NTN received from the manager function to the BSS of the telecommunications network.

Figure 4:
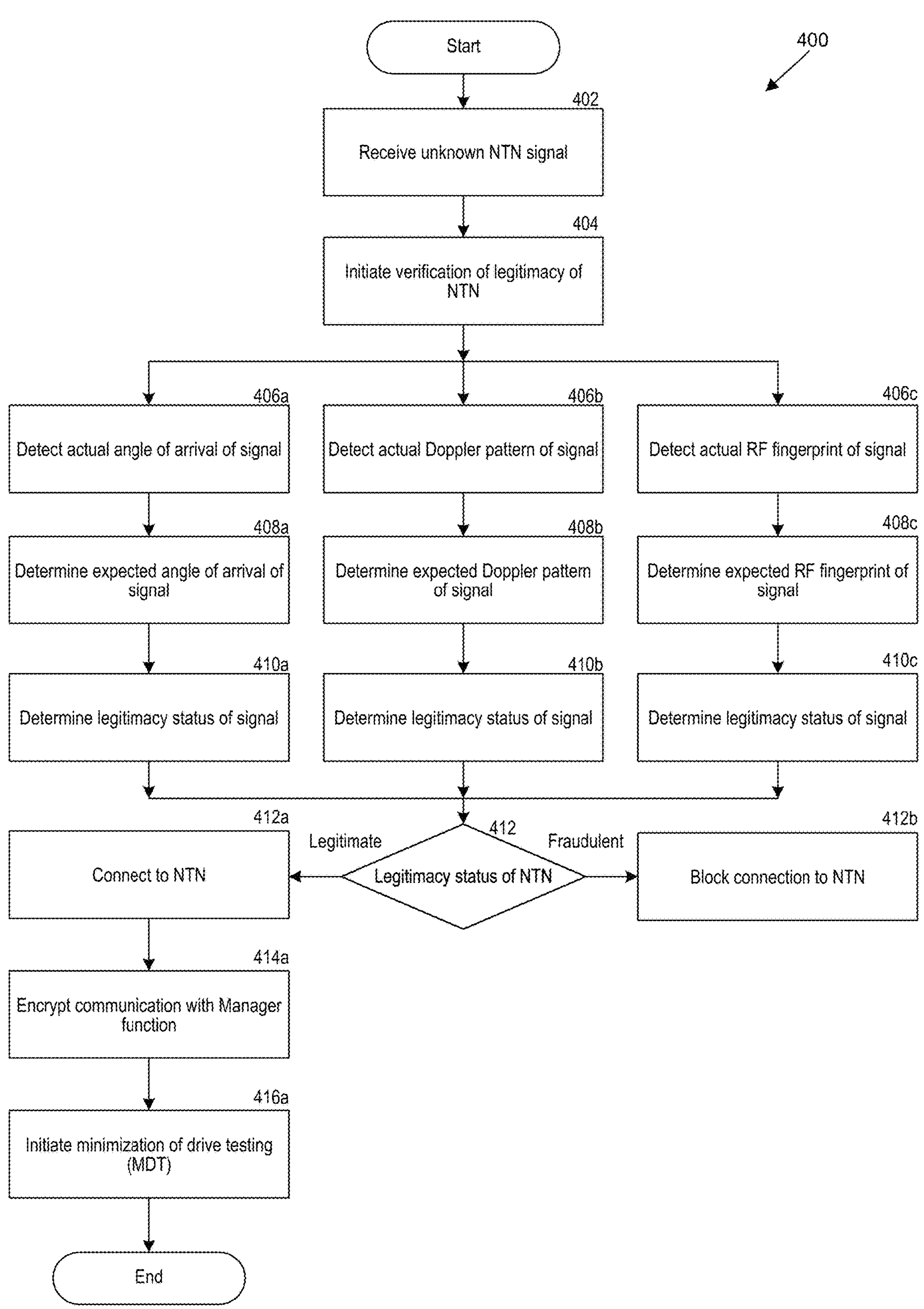
FIG. 4 is a flowchart of a method for implementing at least some aspects of the disclosed technology.

FIG. 4 is a flowchart of a method 400 for implementing at least some aspects of the disclosed technology. The disclosed technology relates to a wireless device comprising at least one hardware processor and at least one non-transitory memory storing instructions. At 402, the wireless device receives a signal identifying a transmitter of a purported NTN. The transmitter is unknown to the wireless device. At 404, in response to the received signal, the wireless device initiates a verification of a legitimacy status of the purported NTN. At 406*a*, in response to the initiation of the verification of the legitimacy status of the purported NTN, the wireless device detects an actual angle of arrival of the signal at the wireless device from the purported NTN. Alternatively, at 406*b*, in response to the initiation of the verification of the legitimacy status of the purported NTN, the wireless device detects an actual Doppler pattern of the signal at the wireless device from the purported NTN. Alternatively, at 406*c*, in response to the initiation of the verification of the legitimacy status of the purported NTN, the wireless device detects an actual RF fingerprint of the signal at the wireless device from the purported NTN.

At 408*a*, the wireless device determines an expected angle of arrival of the signal at the wireless device from a legitimate NTN known to the wireless device, based on at least one of a current location of the wireless device, a current orientation of the wireless device, or a current speed of the wireless device. Alternatively, at 408*b*, the wireless device determines an expected Doppler pattern of the signal at the wireless device from a legitimate NTN known to the wireless device, based on at least one of a current location of the wireless device, a current orientation of the wireless device, or a current speed of the wireless device. Alternatively, at 408*c*, the wireless device determines an expected RF fingerprint of the signal at the wireless device from a legitimate NTN known to the wireless device, based on at least one of a current location of the wireless device, a current orientation of the wireless device, or a current speed of the wireless device. The legitimate NTN is known to the wireless device from flight path characteristics and a current operational status of at least one network node of the legitimate NTN received from a manager function disposed in a home terrestrial telecommunications network of the wireless device. The flight path characteristics of the at least one network node of the legitimate NTN include a location, a direction of travel, an azimuth, an elevation, or a speed of travel of the network node. The current operational status of the at least one network node of the legitimate NTN comprises an indicator for whether the network node is on air, off air, access-restricted, undergoing a planned service outage, or undergoing an unplanned service outage. The wireless device receives the flight path characteristics and a current operational status of the at least one network node of the legitimate NTN from the manager function during a start-up sequence of the wireless device. In some implementations, upon receiving flight path characteristics and a current operational status of the at least one network node of the legitimate NTN from the manager function, the wireless device initiates a timer measuring a staleness status of the received flight path characteristics and the current operational status of the at least one network node and, upon expiry of the timer, the wireless device initiates a request to the manager function to send updated flight path characteristics and current operational status of the at least one network node of the legitimate NTN.

At 410*a*, the wireless device determines a legitimacy status of the purported NTN based on a comparison between the expected angle of arrival of the signal at the wireless device and the actual angle of arrival of the signal at the wireless device. The legitimacy status of the purported NTN is legitimate if the actual angle of arrival of the signal is within a threshold deviation of the expected angle of arrival of the signal. The legitimacy status of the purported NTN is fraudulent if the actual angle of arrival of the signal is not within a threshold deviation of the expected angle of arrival of the signal. At 410*b*, the wireless device determines a legitimacy status of the purported NTN based on a comparison between the expected Doppler pattern of the signal at the wireless device and the actual Doppler pattern of the signal at the wireless device. The legitimacy status of the purported NTN is legitimate if the actual Doppler pattern of the signal is within a threshold deviation of the expected Doppler pattern of the signal. The legitimacy status of the purported NTN is fraudulent if the actual Doppler pattern of the signal is not within a threshold deviation of the expected Doppler pattern of the signal. At 410*c*, the wireless device determines a legitimacy status of the purported NTN based on a comparison between the expected RF fingerprint of the signal at the wireless device and the actual RF fingerprint of the signal at the wireless device. The legitimacy status of the purported NTN is legitimate if the actual RF fingerprint of the signal is within a threshold deviation of the expected RF fingerprint of the signal. The legitimacy status of the purported NTN is fraudulent if the actual RF fingerprint of the signal is not within a threshold deviation of the expected RF fingerprint of the signal.

At 412, the wireless device takes different actions based on the legitimacy status of the purported NTN. At 412*a*, in response to making the determination that the legitimacy status of the purported NTN is legitimate, the wireless device connects to the purported NTN. Alternatively, at 412*b*, in response to making the determination that the legitimacy status of the purported NTN is fraudulent, the wireless device prohibits itself from connecting to the purported NTN. At 414*a*, in response to the wireless device determining that the legitimacy status of the purported NTN is legitimate, the wireless device is configured to encrypt communication with the manager function using at least one encryption key assigned by the system. At 416*a*, the wireless device initiates an MDT function on the wireless device to periodically measure and report network measurements of the purported NTN to the manager function. The network measurements of the purported NTN reported to the manager function include received signal strength, received signal quality, network latency, network jitter, traffic volume, network reliability, network availability, peak data throughput, user data throughput, spectral efficiency, connection density, energy efficiency, mobility, configured spectral bandwidth, identifier of the network node of the purported NTN, or a device model and software version of the wireless device.

Figure 5:
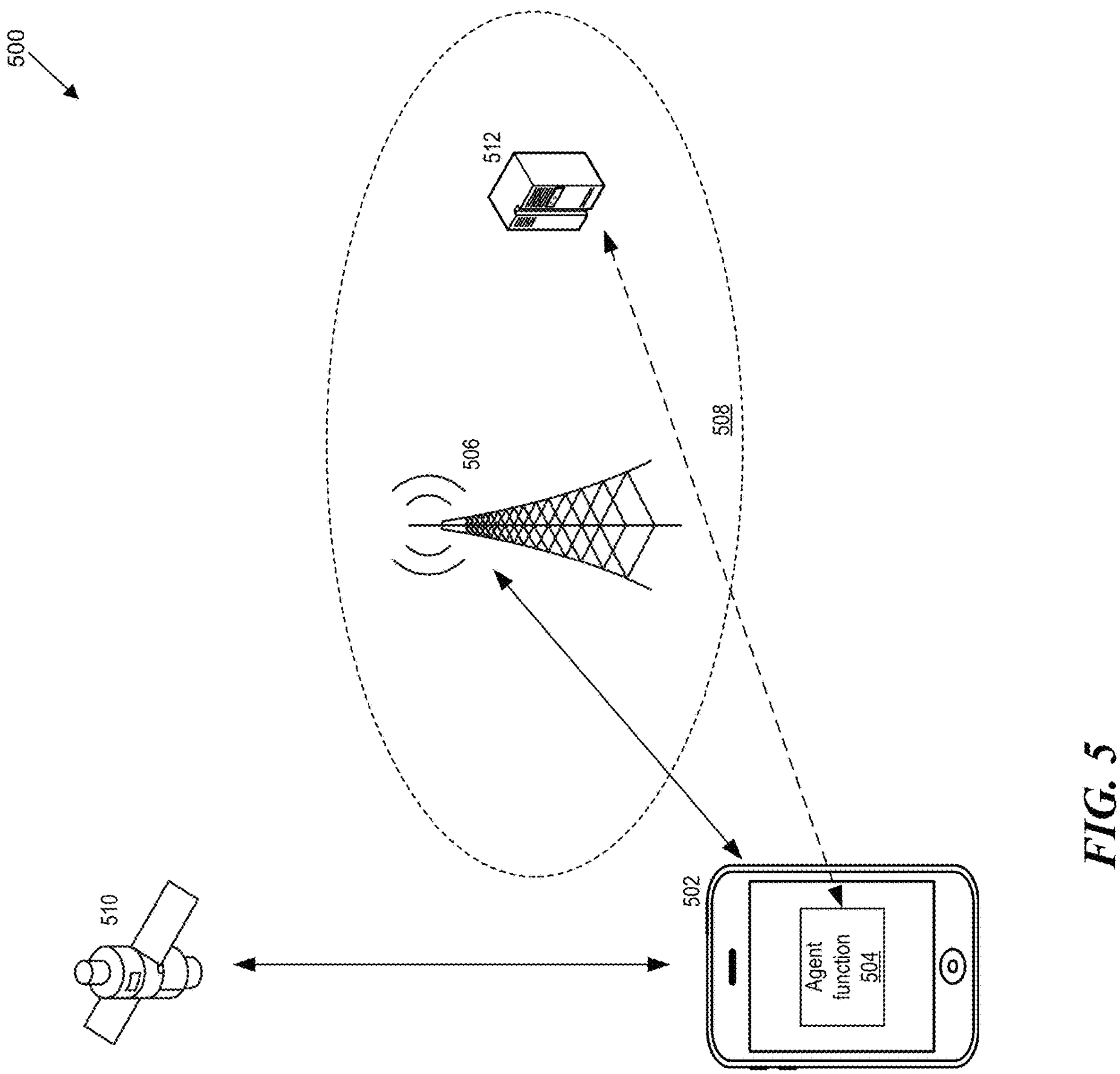
FIG. 5 is a system diagram of a system in which at least some aspects of the disclosed technology are implemented.

FIG. 5 is a system diagram of a system 500 in which at least some aspects of the disclosed technology are implemented. agent function 504 is a software component that is an agent of a system on the wireless device 502. In a normal operating mode of the wireless device 502, the wireless device 502 receives service from a terrestrial home telecommunications network 508 to which a subscriber of the wireless device 502 subscribes. Node 506 is a node of the home telecommunications network 508 from which the wireless device 502 receives service. The home telecommunications network 508 can be a 2G, 3G, 4G, 5G, 6G, or similar advanced telecommunications network. Transmitter 510 is a node of a purported NTN that is unknown to the wireless device 502, from which the wireless device 502 receives a signal. manager function 512 is a software component that is a manager function of a system disposed on the home telecommunications network 508. The manager function 512 maintains a periodically updated repository of information regarding flight path characteristics and operating status of legitimate NTNs that are known to an operator of the home telecommunications network 508, and to which the operator may allow the wireless device 502 to connect.

Computer System

Figure 6:
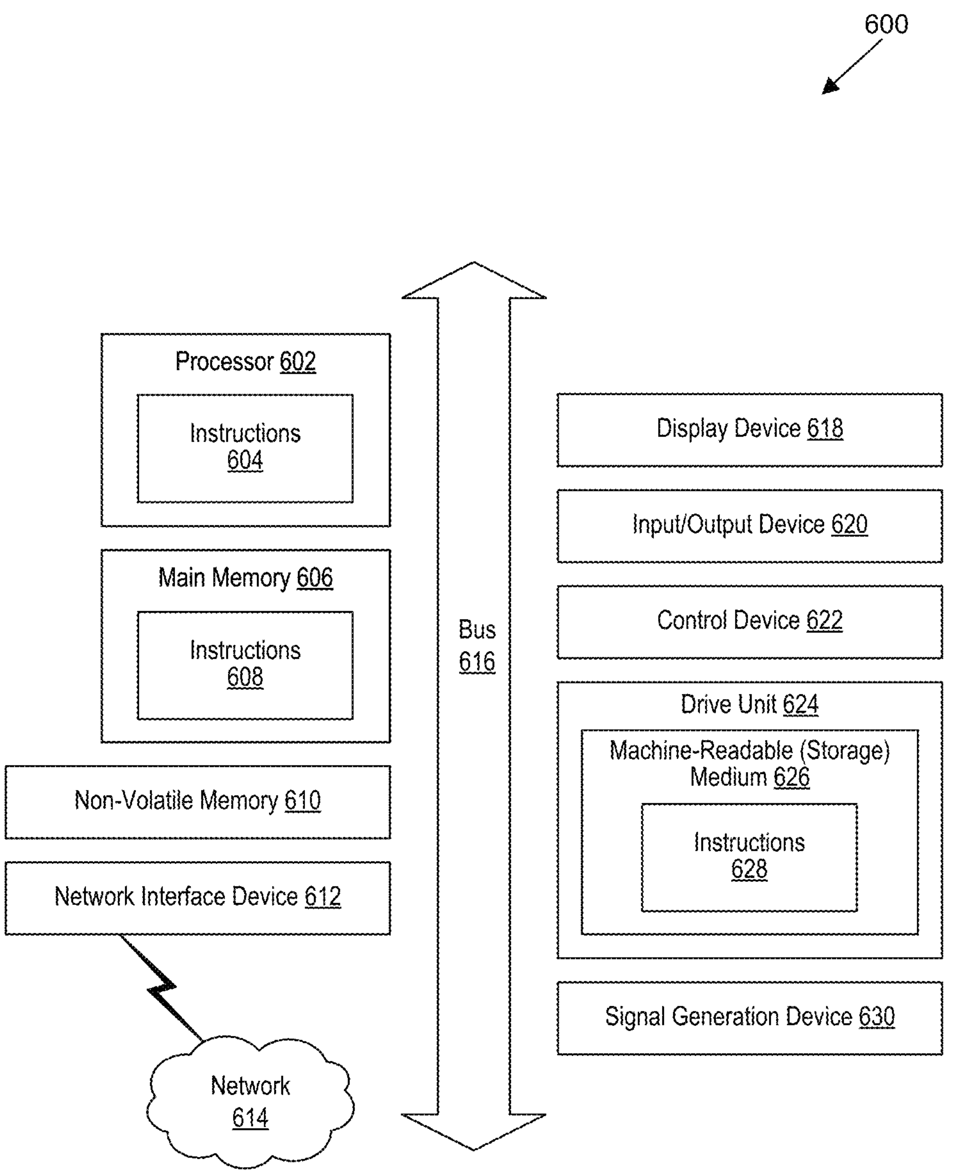
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a machine-readable (storage) medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real time, in near real time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A wireless device comprising:

at least one hardware processor; and at least one non-transitory memory storing instructions, which, when executed by the at least one hardware processor, cause the wireless device to:

receive a signal identifying a transmitter of a purported non-terrestrial network (NTN), wherein the transmitter is unknown to the wireless device;

in response to the received signal, cause the wireless device to initiate a verification of a legitimacy status of the purported NTN; and in response to the initiation of the verification of the legitimacy status of the purported NTN:

detect an actual angle of arrival of the signal at the wireless device from the purported NTN, determine an expected angle of arrival of the signal at the wireless device from a legitimate NTN known to the wireless device, based on at least one of a current location of the wireless device, a current orientation of the wireless device, or a current speed of the wireless device, and determine a legitimacy status of the purported NTN based on a comparison between the expected angle of arrival of the signal at the wireless device and the actual angle of arrival of the signal at the wireless device, wherein the legitimacy status of the purported NTN is legitimate if the actual angle of arrival of the signal is within a threshold deviation of the expected angle of arrival of the signal, and wherein the legitimacy status of the purported NTN is fraudulent if the actual angle of arrival of the signal is not within the threshold deviation of the expected angle of arrival of the signal.

2. The wireless device of claim 1 further caused to:

in response to making the determination that the legitimacy status of the purported NTN is legitimate, allow the wireless device to connect to the purported NTN.

3. The wireless device of claim 1 further caused to:

in response to making the determination that the legitimacy status of the purported NTN is fraudulent, prohibit the wireless device from connecting to the purported NTN.

4. The wireless device of claim 1, wherein the legitimate NTN is known to the wireless device from flight path characteristics and a current operational status of at least one network node of the legitimate NTN received from a manager function disposed in a home terrestrial telecommunications network of the wireless device, wherein the flight path characteristics of the at least one network node of the legitimate NTN include a location, a direction of travel, an azimuth, an elevation, or a speed of travel of the network node, and wherein the current operational status of the at least one network node of the legitimate NTN comprises an indicator for whether the network node is on air, off air, access-restricted, undergoing a planned service outage, or undergoing an unplanned service outage.

5. The wireless device of claim 4 further caused to, in response to the wireless device determining that the legitimacy status of the purported NTN is legitimate:

configure the wireless device to encrypt communication with the manager function using at least one encryption key assigned by the wireless device; and initiate a minimization of drive testing (MDT) function on the wireless device to periodically measure and report network measurements of the purported NTN to the manager function, wherein the network measurements of the purported NTN reported to the manager function include received signal strength, received signal quality, network latency, network jitter, traffic volume, network reliability, network availability, peak data throughput, user data throughput, spectral efficiency, connection density, energy efficiency, mobility, configured spectral bandwidth, identifier of the network node of the purported NTN, or a device model and software version of the wireless device.

6. The wireless device of claim 4 caused to:

receive flight path characteristics and the current operational status of the at least one network node of the legitimate NTN from the manager function during a start-up sequence of the wireless device.

7. The wireless device of claim 4 further caused to, upon receiving the flight path characteristics and the current operational status of the at least one network node of the legitimate NTN from the manager function:

initiate a timer measuring a staleness status of the received flight path characteristics and the current operational status of the at least one network node; and upon expiry of the timer, initiate a request to the manager function to send updated flight path characteristics and current operational status of the at least one network node of the legitimate NTN.

8. A wireless device comprising:

at least one hardware processor; and at least one non-transitory memory storing instructions, which, when executed by the at least one hardware processor, cause the wireless device to:

receive a signal identifying a transmitter of a purported non-terrestrial network (NTN), wherein the transmitter is unknown to the wireless device;

in response to the received signal, cause the wireless device to initiate a verification of a legitimacy status of the purported NTN; and in response to the initiation of the verification of the legitimacy status of the purported NTN:

detect an actual Doppler pattern of the signal at the wireless device from the purported NTN, determine an expected Doppler pattern of the signal at the wireless device from a legitimate NTN known to the wireless device, based on at least one of a current location of the wireless device, a current orientation of the wireless device, or a current speed of the wireless device, and determine a legitimacy status of the purported NTN based on a comparison between the expected Doppler pattern of the signal at the wireless device and the actual Doppler pattern of the signal at the wireless device, wherein the legitimacy status of the purported NTN is legitimate if the actual Doppler pattern of the signal is within a threshold deviation of the expected Doppler pattern of the signal, and wherein the legitimacy status of the purported NTN is fraudulent if the actual Doppler pattern of the signal is not within the threshold deviation of the expected Doppler pattern of the signal.

9. The wireless device of claim 8 further caused to:

in response to making the determination that the legitimacy status of the purported NTN is legitimate, allow the wireless device to connect to the purported NTN.

10. The wireless device of claim 8 further caused to:

in response to making the determination that the legitimacy status of the purported NTN is fraudulent, prohibit the wireless device from connecting to the purported NTN.

11. The wireless device of claim 8, wherein the legitimate NTN is known to the wireless device from flight path characteristics and a current operational status of at least one network node of the legitimate NTN received from a manager function disposed in a home terrestrial telecommunications network of the wireless device, wherein the flight path characteristics of the at least one network node of the legitimate NTN include a location, a direction of travel, an azimuth, an elevation, or a speed of travel of the network node, and wherein the current operational status of the at least one network node of the legitimate NTN comprises an indicator for whether the network node is on air, off air, access-restricted, undergoing a planned service outage, or undergoing an unplanned service outage.

12. The wireless device of claim 11 further caused to, in response to the wireless device determining that the legitimacy status of the purported NTN is legitimate:

configure the wireless device to encrypt communication with the manager function using at least one encryption key assigned by the wireless device; and initiate a minimization of drive testing (MDT) function on the wireless device to periodically measure and report network measurements of the purported NTN to the manager function, wherein the network measurements of the purported NTN reported to the manager function include received signal strength, received signal quality, network latency, network jitter, traffic volume, network reliability, network availability, peak data throughput, user data throughput, spectral efficiency, connection density, energy efficiency, mobility, configured spectral bandwidth, identifier of the network node of the purported NTN, or a device model and software version of the wireless device.

13. The wireless device of claim 11 caused to:

receive flight path characteristics and a current operational status of the at least one network node of the legitimate NTN from the manager function during a start-up sequence of the wireless device.

14. The wireless device of claim 11 further caused to, upon receiving the flight path characteristics and the current operational status of the at least one network node of the legitimate NTN from the manager function:

initiate a timer measuring a staleness status of the received flight path characteristics and the current operational status of the at least one network node; and upon expiry of the timer, initiate a request to the manager function to send updated flight path characteristics and current operational status of the at least one network node of the legitimate NTN.

15. A wireless device comprising:

at least one hardware processor; and at least one non-transitory memory storing instructions, which, when executed by the at least one hardware processor, cause the wireless device to:

receive a signal identifying a transmitter of a purported non-terrestrial network (NTN), wherein the transmitter is unknown to the wireless device;

in response to the received signal, cause the wireless device to initiate a verification of a legitimacy status of the purported NTN; and in response to the initiation of the verification of the legitimacy status of the purported NTN:

detect an actual radio frequency (RF) fingerprint of the signal at the wireless device from the purported NTN, determine an expected RF fingerprint of the signal at the wireless device from a legitimate NTN known to the wireless device, based on at least one of a current location of the wireless device, a current orientation of the wireless device, or a current speed of the wireless device, and determine a legitimacy status of the purported NTN based on a comparison between the expected RF fingerprint of the signal at the wireless device and the actual RF fingerprint of the signal at the wireless device, wherein the legitimacy status of the purported NTN is legitimate if the actual RF fingerprint of the signal is within a threshold deviation of the expected RF fingerprint of the signal, and wherein the legitimacy status of the purported NTN is fraudulent if the actual RF fingerprint of the signal is not within the threshold deviation of the expected RF fingerprint of the signal.

16. The wireless device of claim 15 further caused to:

in response to making the determination that the legitimacy status of the purported NTN is legitimate, allow the wireless device to connect to the purported NTN.

17. The wireless device of claim 15 further caused to:

in response to making the determination that the legitimacy status of the purported NTN is fraudulent, prohibit the wireless device from connecting to the purported NTN.

18. The wireless device of claim 15, wherein the legitimate NTN is known to the wireless device from flight path characteristics and a current operational status of at least one network node of the legitimate NTN received from a manager function disposed in a home terrestrial telecommunications network of the wireless device, wherein the flight path characteristics of the at least one network node of the legitimate NTN include a location, a direction of travel, an azimuth, an elevation, or a speed of travel of the network node, and wherein the current operational status of the at least one network node of the legitimate NTN comprises an indicator for whether the network node is on air, off air, access-restricted, undergoing a planned service outage, or undergoing an unplanned service outage.

19. The wireless device of claim 18 further caused to, in response to the wireless device determining that the legitimacy status of the purported NTN is legitimate:

configure the wireless device to encrypt communication with the manager function using at least one encryption key assigned by the wireless device; and initiate a minimization of drive testing (MDT) function on the wireless device to periodically measure and report network measurements of the purported NTN to the manager function, wherein the network measurements of the purported NTN reported to the manager function include received signal strength, received signal quality, network latency, network jitter, traffic volume, network reliability, network availability, peak data throughput, user data throughput, spectral efficiency, connection density, energy efficiency, mobility, configured spectral bandwidth, identifier of the network node of the purported NTN, or a device model and software version of the wireless device.

20. The wireless device of claim 18 further caused to, upon receiving the flight path characteristics and the current operational status of the at least one network node of the legitimate NTN from the manager function:

initiate a timer measuring a staleness status of the received flight path characteristics and the current operational status of the at least one network node; and upon expiry of the timer, initiate a request to the manager function to send updated flight path characteristics and current operational status of the at least one network node of the legitimate NTN.

* * * * *